United States Patent
Jacob et al.

(10) Patent No.: US 12,372,413 B2
(45) Date of Patent: Jul. 29, 2025

(54) ULTRAFAST IMAGING SYSTEM WITHOUT ACTIVE PIXEL RESET

(71) Applicant: Purdue Research Foundation, West Lafayette, IN (US)

(72) Inventors: Zubin Jacob, West Lafayette, IN (US); Liping Yang, Changchun (CN); Leif H Bauer, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 662 days.

(21) Appl. No.: 17/627,807

(22) PCT Filed: Jul. 26, 2020

(86) PCT No.: PCT/US2020/043651
§ 371 (c)(1),
(2) Date: Jan. 17, 2022

(87) PCT Pub. No.: WO2021/021690
PCT Pub. Date: Feb. 4, 2021

(65) Prior Publication Data
US 2022/0260425 A1 Aug. 18, 2022

Related U.S. Application Data

(60) Provisional application No. 62/879,051, filed on Jul. 26, 2019.

(51) Int. Cl.
*G01J 5/20* (2006.01)
*G01J 5/00* (2022.01)

(52) U.S. Cl.
CPC ......... *G01J 5/20* (2013.01); *G01J 2005/0077* (2013.01); *G01J 2005/202* (2013.01)

(58) Field of Classification Search
CPC ................ G01J 5/20; G01J 2005/0077; G01J 2005/202; G01J 5/22; G01J 5/24
See application file for complete search history.

(56) References Cited

U.S. PATENT DOCUMENTS

| 5,090,819 A | 2/1992 | Kapitulnik |
| 9,601,144 B1 | 3/2017 | Mehta et al. |

(Continued)

FOREIGN PATENT DOCUMENTS

DE   102015220271   4/2017

OTHER PUBLICATIONS

Chen et al., All-Optical Switching of Magnetic Tunnel Junctions with Single Subpicosecond Laser Pulses, Phys. Rev. Applied 7, 021001 (2017).

(Continued)

*Primary Examiner* — Carolyn Fin
(74) *Attorney, Agent, or Firm* — Piroozi-IP, LLC

(57) ABSTRACT

A bolometric imaging system is disclosed which includes an array of nano-pixels, each including an optical stack, each including an absorptive layer where incident radiation is converted to heat which simultaneously acts as a first electrode layer vertically disposed adjacent the Free Layer, a fixed magnetic polarity layer (Fixed Layer) in a first magnetic direction, a barrier layer vertically disposed adjacent to the Fixed Layer, a selective magnetic polarity layer (Free Layer) vertically disposed adjacent to the barrier layer, a second electrode layer vertically disposed adjacent the Fixed Layer. Photons absorbed by the optical stack are converted into heat to thereby switch magnetic polarity in the Free Layer. The switch in polarity does not require the stack to be reset to a neutral state prior to such switching. Each nano-pixel output is a digital signal generated by (Continued)

photons above a pre-determined energy threshold. The system further includes a readout circuit.

17 Claims, 9 Drawing Sheets

(56) References Cited

U.S. PATENT DOCUMENTS

| | | |
|---|---|---|
| 9,933,310 B2 | 4/2018 | Fong |
| 2008/0272302 A1 | 11/2008 | Frey et al. |
| 2011/0304005 A1 | 12/2011 | Brueckl et al. |
| 2016/0043264 A1 | 2/2016 | Song et al. |
| 2017/0334717 A1 | 11/2017 | Farrow et al. |
| 2023/0124189 A1* | 4/2023 | Lee ............... G01J 5/045 250/330 |
| 2024/0219240 A1* | 7/2024 | Kim ............... H04N 25/21 |

OTHER PUBLICATIONS

Yang et al., Single-photon pulse induced giant response in N > 100 qubit system, Npj Quantum Information 6, 1 (2020).
Prejbeanu et al., Thermally assisted MRAM, J. Phys.: Condens. Matter 19, 165218 (2007).
Pushp et al., Giant thermal spin-torque-assisted magnetic tunnel junction switching, Proc Natl Acad Sci USA 112, 6585 (2015).
Allmaras et al., Demonstration of a Thermally Coupled Row-Column SNSPD Imaging Array, Nano Lett. 20, 2163 (2020).
Wollman et al., Kilopixel array of superconducting nanowire single-photon detectors, Opt. Express 27, 35279 (2019).
Rothman et al., HgCdTe APDs for Time Resolved Space Applications, SPIE, Biarritz, France, (2017).
Prejbeanu et al., Thermally assisted MRAMs: ultimate scalability and logic functionalities, J. Phys. D: Appl. Phys. 46, 074002 (2013).
Savoini et al., Highly efficient all-optical switching of magnetization in GdFeCo microstructures by interference-enhanced absorption of light, Phys. Rev. B 86, 140404 (2012).
Bandiera et al., Spin transfer torque switching assisted by thermally induced anisotropy reorientation in perpendicular magnetic tunnel junctions, Appl. Phys. Lett. 99, 202507 (2011).
Kimel et al., Writing magnetic memory with ultrashort light pulses, Nature Reviews Materials 4, 3 (2019).
Charaev et al., Large-area microwire MoSi single-photon detectors at 1550 nm wavelength, Appl. Phys. Lett. 116, 242603 (2020).
He et al., Ultrafast demagnetization enhancement in CoFeB/MgO/CoFeB magnetic tunneling junction driven by spin tunneling current, Sci Rep 3, 2883 (2013).
Choi et al., Spin current generated by thermally driven ultrafast demagnetization, Nat Commun 5, 4334 (2014).
Marsili et al., Detecting single infrared photons with 93% system efficiency, Nature Photon 7, 210 (2013).
Morimoto et al., Megapixel time-gated SPAD image sensor for 2D and 3D imaging applications, Optica 7, 346 (2020).
Fossum et al., The Quanta Image Sensor: Every Photon Counts, Sensors 16, 1260 (2016).
Kryder et al., Heat Assisted Magnetic Recording, Proceedings of the IEEE 96, 1810 (2008).
Zhao et al., Atomic-scale magnetometry of distant nuclear spin clusters via nitrogen-vacancy spin in diamond, Nature nanotechnology 6, 242 (2011).
Lipkin et al., Validity of Many-body Approximation Methods for a Solvable Model, Nuclear Physics 62, 188 (1965).
Zhang et al., Observation of a many-body dynamical phase transition with a 53-qubit quantum simulator, Nature 551, 601 (2017).
Bernien et al., Probing many-body dynamics on a 51-atom quantum simulator, Nature 551, 579 (2017).
Harris et al., Phase transitions in a programmable quantum spin glass simulator, Science 361, 162 (2018).
Makhalov et al., Probing quantum criticality and symmetry breaking at the microscopic level, arXiv preprint arXiv:1905.00807 (2019).
Ryan et al., Robust Decoupling Techniques to Extend Quantum Coherence in Diamond, Phys. Rev. Lett. 105, 200402 (2010).
Smeltzer et al., Robust control of individual nuclear spins in diamond, Phys. Rev. A 80, 050302 (2009).
Zhao et al., Decoherence and dynamical decoupling control of nitrogen vacancy center electron spins in nuclear spin baths, Phys. Rev. B 85, 115303 (2012).
Yang et al., Quantum many-body theory for electron spin decoherence in nanoscale nuclear spin baths, Reports on Progress in Physics 80, 016001 (2016).
Balasubramanian et al., Ultralong spin coherence time in isotopically engineered diamond, Nature materials 8, 383 (2009).
Ladd, D. Maryenko, Y. Yamamoto, E. Abe, and K. M. Itoh, Coherence time of decoupled nuclear spins in silicon, Phys. Rev. B 71, 014401 (2005).
Maurer et al., Room-Temperature Quantum Bit Memory Exceeding One Second, Science 336, 1283 (2012).
Dziarmaga, Dynamics of a quantum phase transition and relaxation to a steady state, Advances in Physics 59, 1063 (2010).
Defenu et al., Dynamical Critical Scaling of Long-Range Interacting Quantum Magnets, Phys. Rev. Lett. 121, 240403 (2018).
Xue et al., Universal driven critical dynamics across a quantum phase transition in ferromagnetic spinor atomic Bose-Einstein condensates, Phys. Rev. A 98, 013619 (2018).
Ribeiro et al., Exact spectrum of the Lipkin-Meshkov-Glick model in the thermodynamic limit and finite-size corrections, Phys. Rev. E 78, 021106 (2008).
Botet et al., Large-size critical behavior of infinitely coordinated systems, Phys. Rev. B 28, 3955 (1983).
Dusuel et al., Continuous unitary transformations and finite-size scaling exponents in the Lipkin-Meshkov-Glick model, Phys. Rev. B 71, 224420 (2005).
Gupta et al., A Report on the Wilson Cloud Chamber and Its Applications in Physics, Rev. Mod. Phys., 18, 225 (1946).
Glaser, Some Effects of Ionizing Radiation on the Formation of Bubbles in Liquids, Phys. Rev. 87, 665 (1952).
Gol'Tsman et al., Picosecond superconducting single-photon optical detector, Applied physics letters 79, 705 (2001).
Eisaman et al., Invited Review Article: Single-photon sources and detectors, Review of scientific instruments 82, 071101 (2011).
Yang et al., Quantum critical detector: amplifying weak signals using discontinuous quantum phase transitions, Optics express 27, 10482 (2019).
Yang et al., Engineering first-order quantum phase transitions for weak signal detection, Journal of Applied Physics 126, 174502 (2019).
Giovannetti et al., Quantum-Enhanced Measurements: Beating the Standard Quantum Limit, Science 306, 1330 (2004).
Giovannetti et al., Quantum Metrology, Physical review letters 96, 010401 (2006).
Degen et al., Quantum sensing, Rev. Mod. Phys. 89, 035002 (2017).
Yurke et al., SU(2) and SU(1,1) interferometers, Phys. Rev. A 33, 4033 (1986).
Dowling, Correlated input-port, matter-wave interferometer: Quantum-noise limits to the atom-laser gyroscope, Phys. Rev. A 57, 4736 (1998).
Bollinger et al., Optimal frequency measurements with maximally correlated states, Phys. Rev. A 54, R4649 (1996).
Caves, Quantum limits on noise in linear amplifiers, Physical Review D 26, 1817 (1982).
Bergeal et al., Phase-preserving amplification near the quantum limit with a Josephson ring modulator, Nature Physics 6, 296 (2010).
Young et al., General modeling framework for quantum photodetectors, Phys. Rev. A 97, 033836 (2018).
Wang et al., Efficient excitation of a two-level atom by a single photon in a propagating mode, Phys. Rev. A 83, 063842 (2011).
Yang et al., Concept of quantum timing jitter and non-Markovian limits in single-photon detection, Phys. Rev. A 97, 013833 (2018).

(56) References Cited

OTHER PUBLICATIONS

Jarmola et al., Temperature- and Magnetic-Field-Dependent Longitudinal Spin Relaxation in Nitrogen-Vacancy Ensembles in Diamond, Phys. Rev. Lett. 108, 197601 (2012).
Chu et al., All-optical control of a single electron spin in diamond, Phys., Rev. A 91, 021801 (2015).

* cited by examiner

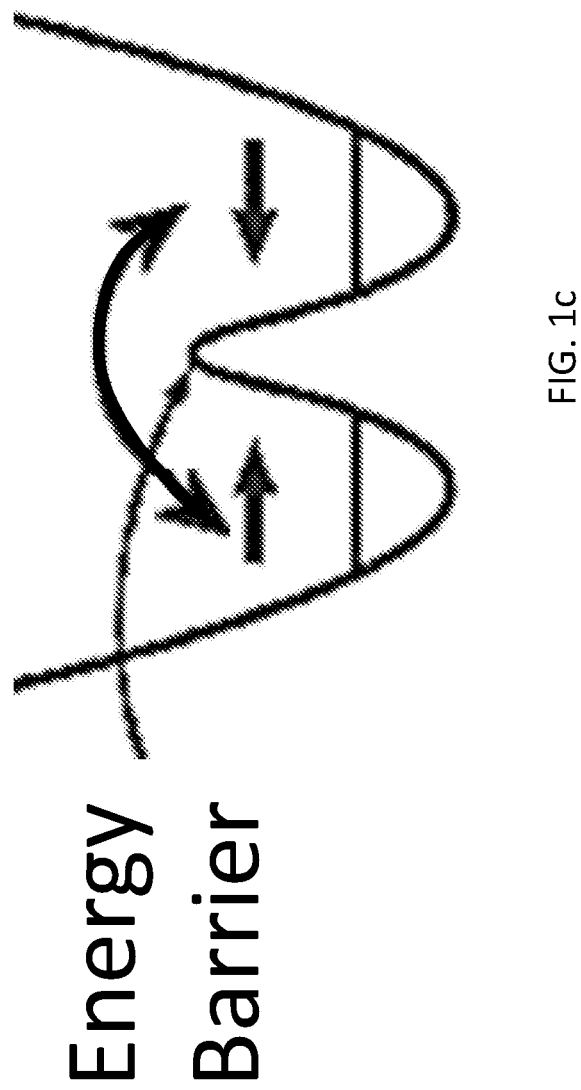

ULTRAFAST IMAGING SYSTEM WITHOUT ACTIVE PIXEL RESET

CROSS-REFERENCE TO RELATED APPLICATIONS

The present patent application is a 35 U.S.C. § 371 Nationalization Application of and claims the priority benefit of the International Patent Application Serial No. PCT/US20/43651 filed Jul. 26, 2020, which is related to and claims the priority benefit of U.S. Provisional Patent Application Ser. No. 62/879,051, filed Jul. 26, 2019, entitled SINGLE-PHOTON DETECTION USING QUANTUM PHASE TRANSITIONS, the contents of each of which are hereby incorporated by reference in its entirety into the present disclosure.

STATEMENT REGARDING GOVERNMENT FUNDING

This invention was made with government support under W911NF-18-1-0074 awarded by the Army Research Office. The government has certain rights in the invention.

TECHNICAL FIELD

The present disclosure generally relates to imaging systems, and in particular, to a bolometric imaging system that is capable of high speed hyperspectral polarimetric imaging in the visible, infrared and THz radiation spectrum without the need for active pixel reset.

BACKGROUND

This section introduces aspects that may help facilitate a better understanding of the disclosure. Accordingly, these statements are to be read in this light and are not to be understood as admissions about what is or is not prior art.

Much effort and research is now being expended in autonomous vehicles. Success of these vehicles in no small part will be based on their ability to sense fast moving objects. For example, fast-moving autonomous navigation should be capable of sensing objects passing at 75 mph. In addition, such advanced imaging systems must be capable of handling spectral sensitivity to various spectra, including be able to discern between red, green, blue, infrared, and have tera Hz electromagnetic capabilities. Such imaging systems must also be able to register new images without the need for resetting pixels.

A comparison across leading candidate technologies that rely primarily on phase transitions include: $VO_2$ (FLIR, metal-insulator phase transition), BST (old FLIR models, ferroelectric phase transition) and WSi/NbN (superconducting phase transition). However, none of these technologies allow for sub-wavelength pixel, low noise and simultaneous low size, weight, power and performance (SWaP). Neither can these baseline technologies reach longwave infrared (LWIR) goals of $10^9$ image point captures per second.

Currently existing pixels within thermal IR cameras can be classified as belonging to two classes: 1) microbolometric (room temperature); and 2) low-bandgap-semiconducting (low temperature). The pixel operating mechanisms in these two classes are fundamentally different. In microbolometers, pixels convert incident radiation into heat which is then sensed to generate an image. Conversely, in the low-bandgap semi-conductors class, the pixels absorb the photons and convert the photons to electron-hole pairs.

Another important bolometric technology is based on the superconducting-normal metal (WSi, NbN) phase transition which is the foremost single photon detection technology. However, this technology functions at cryogenic temperatures leading to large size, weight and power (SWAP) making it difficult for use in autonomous navigation and many other practical applications.

Each one of these technologies have been under development for over two decades. However, each of these technologies suffer from low speed or high SWAP, a requirement particularly needed for autonomous vehicles.

Therefore, there is an unmet need for a novel bolometric imaging system that can acquire images ultrafast, be sensitive across a variety of spectral ranges (infrared and tera hertz (THz)), and which does not require active pixel resetting.

SUMMARY

A bolometric imaging system is disclosed. The system includes an array of nano-pixels. Each nano-pixel includes an optical stack. Each optical stack includes an electromagnetic absorptive layer where incident radiation is converted to heat which simultaneously acts as a first electrode layer vertically disposed adjacent the Free Layer, a fixed magnetic polarity layer (Fixed Layer) in a first magnetic direction, a barrier layer vertically disposed adjacent to the Fixed Layer, a selective magnetic polarity layer (Free Layer) vertically disposed adjacent to the barrier layer, wherein when the magnetic polarity of the Free Layer is along the first magnetic direction, the optical stack is in a parallel (P) configuration whereby the optical stack presents an electrical impedance to current flow below an impedance threshold, and when the magnetic polarity of the Free Layer is opposite the first direction, the optical stack is in an anti-parallel (AP) configuration whereby the optical stack presents an electrical impedance to current flow higher than the impedance threshold, a second electrode layer vertically disposed adjacent the Fixed Layer. Photons absorbed by the optical stack are converted into heat to thereby switch the magnetic polarity of the Free Layer. The switch in magnetic polarity does not require the optical stack to be reset to a neutral state prior to such switching. The system further includes a readout circuit coupled to each nano-pixel configured to monitor voltage drop across the optical stack and provide a corresponding signal when the impedance across the optical stack changes.

According to one embodiment, in the above system, the material of the magnetic Fixed Layer and the Free Layer is selected from the group consisting of CoFeB, GdFeCo, TbFeCo, CoFe, Co, Pt, Pd, and a combinations thereof.

According to one embodiment, in the above system, the electromagnetic absorptive layer is configured to receive and convert excitation by photons above a selected photonic energy threshold into heat.

According to one embodiment, in the above system, the barrier layer includes MgO.

According to one embodiment, in the above system, the readout circuit generates a digital output corresponding to the change in electrical impedance of the optical stack.

According to one embodiment, in the above system, the readout circuit signal is multiplexed through electrical channels provided on rows and columns of the array of nano-pixels.

According to one embodiment, in the above system, each nano-pixel is sized between about 10 nm and about 1 µm.

According to one embodiment, in the above system, the selected photonic energy threshold is selected based on ratio of area of a nano-pixel in the array of nano-pixels to distance between two adjacent nano-pixels in the array.

According to one embodiment, in the above system, spectral sensitivity to wavelength of incident photons is based on the electromagnetic absorption of the layers in the optical stack.

According to one embodiment, in the above system, the optical stack further comprises an anti-reflection coating outwardly disposed on the first and second electrode layers.

According to one embodiment, in the above system, optical polarization sensitivity is based on a patterning direction of the optical stack.

According to one embodiment, in the above system, wherein the nano-pixel is sensitive to infrared light when the nano-pixel is between about 20 nm and about 200 nm.

According to one embodiment, in the above system, the optical stack further comprises a light absorption layer disposed between the Free Layer and the electrode layer.

According to one embodiment, in the above system, the electromagnetic absorptive layer includes TiN, WSi, NbN, Au.

According to one embodiment, in the above system, the optical stack further comprises a light reflective layer vertically disposed adjacent the second electrode layer.

According to one embodiment, in the above system, the nano-pixel further comprises a heat insulating layer horizontally disposed adjacent the optical stack.

According to one embodiment, in the above system, the readout circuit signal is multiplexed through a multiplexing system. The multiplexing system includes a plurality of electrical channels along a first direction wherein each of the plurality of the electrical channel includes an electrical impedance placed between the nano-pixels to thereby encode the nano-pixel position in the signal amplitude, and a series of electrical channels along a second direction.

A readout multiplexing system is also disclosed. The multiplexing system includes an array of nano-pixels, and a plurality of electrical channels along a first direction (amplitude channels). Each of the plurality of the electrical channel includes an electrical impedance placed between the nano-pixels to thereby encode the nano-pixel position in the signal amplitude, a series of electrical channels along a second direction (time channels), a time to digital converter coupled to the time channels, and an amplitude to digital converter coupled to the amplitude channels. The synchronization of the amplitude to digital converters and the time to digital converters enables simultaneous readout of the pixel's time and position information.

According to one embodiment, in the above multiplexing system, the amplitude channel further comprises an amplifier placed between the pixels of the amplitude channel.

A method for bolometric imaging is also disclosed. The method includes receiving light from an object and applying the received light to a bolometric imaging system at an operational temperature. The operational temperature is between 70° and 400° K, the bolometric imaging system comprising a plurality of nano-pixel. The method also includes maintaining the bolometric imaging system temperature at the operational temperature, applying a read current to the bolometric imaging device to thereby read digital output of the bolometric imaging device, and maintaining the read current within a predetermined envelope.

BRIEF DESCRIPTION OF DRAWINGS

FIG. 1c is a diagram shown depicting the energy barrier concept according to the present disclosure.

FIG. 2b is a voltage waveform of the corresponding stages of FIG. 2a.

DETAILED DESCRIPTION

Figure 1B:
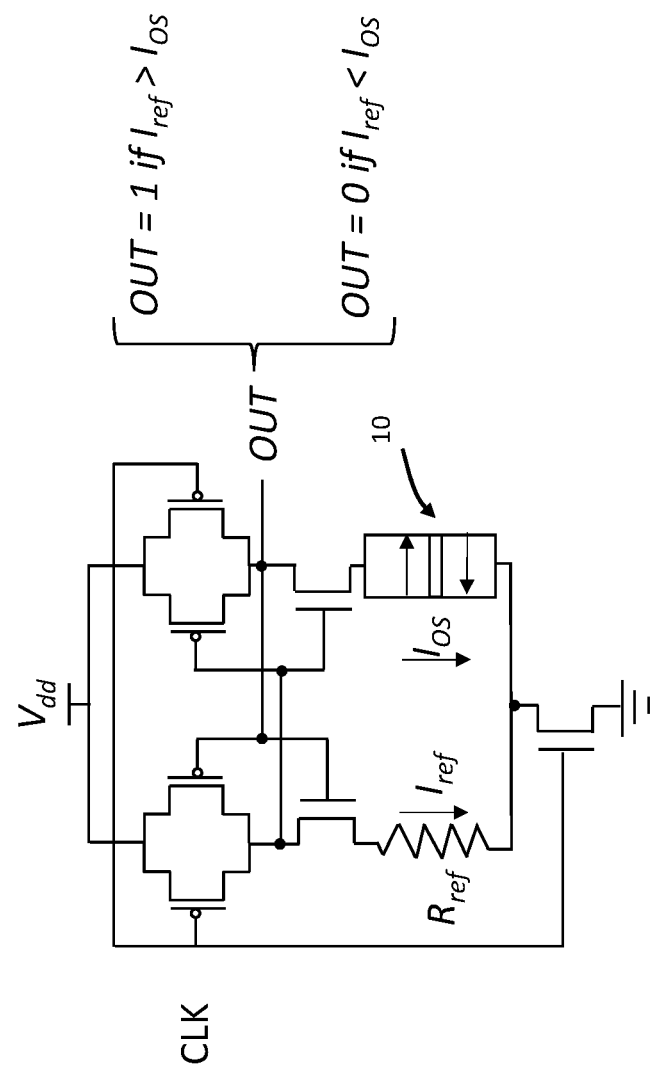
FIG. 1b is a schematic of a precharge sense amplifier according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel bolometric imaging system is disclosed that can acquire images ultrafast, be sensitive across a variety of spectral ranges, and which does not require active pixel resetting. Towards this end, a breakthrough approach is disclosed: quantum event-based 3D thermal vision that breaks away from traditional frame based approaches. Here, asynchronous events are registered on sub-wavelength pixels for fast 3D reconstruction without recourse to underlying frame-based-read-out. The fast depth maps and disparity maps are constructed with high dynamic range through analyzing changes in infrared thermal photon count rate at every pixel. This leads to a quantum stamping of thermal events with spectral resolution. In particular, the novel arrangement of the present disclosure represents a fundamental development using magnetic phase change materials not utilized in any current bolometric technology.

Having shown giant quantum susceptibility of interacting spins biased near a quantum phase transition can be exploited to build next-generation single photon detectors, the novel arrangement of the present disclosure includes spintronic bolometers which achieve a classical analogue of the quantum phase transition in an interacting XY spin chain.

Taking advantage of the theory of quantum world lines, spatio-temporal stamping of asynchronous detection events at high speeds allows for optimum 3D thermal scene reconstruction by ignoring in real-time parts of the scene that do not contain useful information. Furthermore, the dynamic range of detectors of the present disclosure provides a solution to a fundamental challenge of high speeds detection and accurate reconstruction associated with prior art solution. The system of the present disclosure can be configured to register optimal changes in count rate at every subwavelength pixel with high spectral resolution. Thereafter, using a 3D-stereoscopic reconstruction approach tailored to quantum event based vision, image of changes is constructed. By studying large number of asynchronous events and their space-time correlations high resolution 3D maps can then be constructed.

Another important advance of the system of the present disclosure is exploiting the quantum filter function of the atmosphere. The thermal photon counts at every sub-wavelength pixel have unique relative temporal correlation related to the time-delay induced by the atmosphere. This is not evident in the total counts but are measured through spectrally resolved counts. Another significant characteristic of the present disclosure is the measurement hyper-diversity. The system of the present disclosure simulates a magnetic phase transition behavior using carefully engineered magnetic materials in a tunnel junction geometry. This approach is complementary metal oxide semiconductor (CMOS) process compatible and scalable.

To better elucidate the novel arrangement of the present disclosure, an overview of the mechanism is first provided and then key metrics are discussed.

The system includes absorptive metal layer to ensure high efficiency transduction of photons to heat. This absorptive layer also functions as an electrical read-out contact to an array of magnetic tunnel junctions (nano-cylinders) below thereon.

Figure 1A:
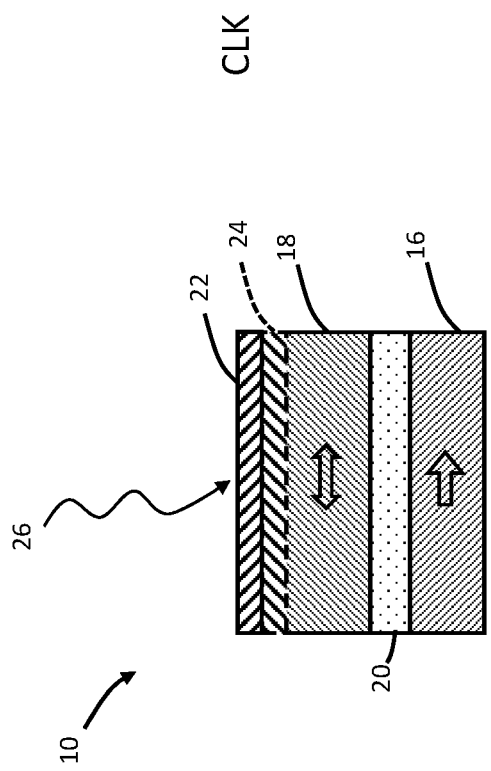
FIG. 1a a schematic of a fundamental optical stack of the present disclosure is shown that is used to generate a nano-pixel.
Figure 2A:
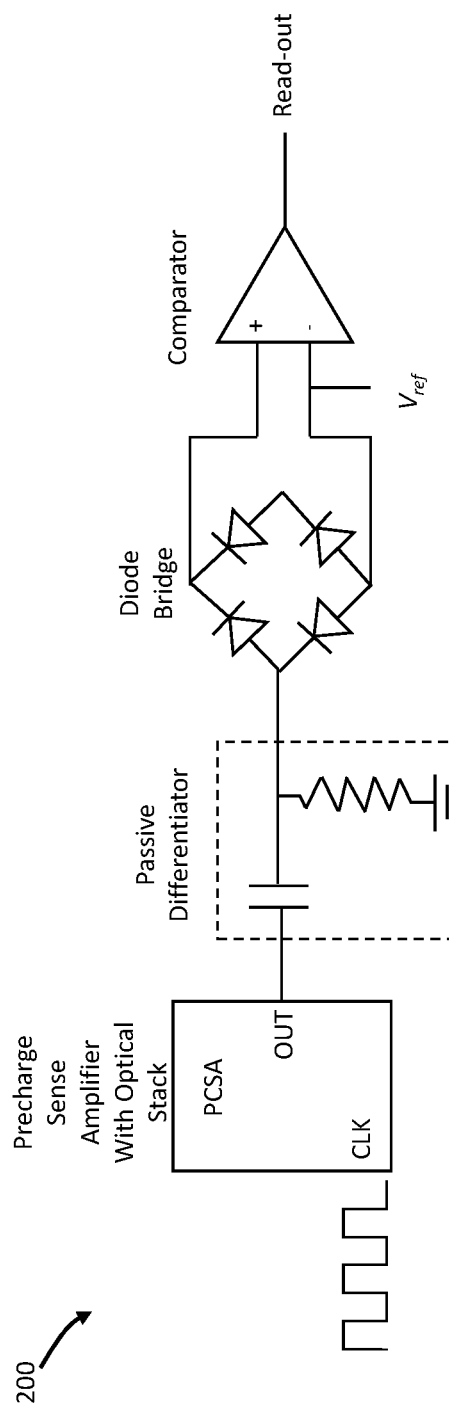
FIG. 2a is a schematic of a nano-pixel representing several stages according to the present disclosure.

Referring to FIG. 1a, a fundamental optical stack 10 of the present disclosure is shown that is used to generate a nano-pixel (see FIG. 2a in cooperation with a precharge sense amplifier shown in FIG. 1b). This fundamental optical stack 10 includes a layer having a fixed magnetic polarity or herein referred to as a Fixed Layer 16 (which has a fixed magnetic orientation along a first direction). The optical stack 10 further includes a barrier layer 20 vertically disposed adjacent to the Fixed Layer 16. The optical stack 10 further includes a second layer vertically disposed adjacent the barrier layer 20 with selective magnetic polarity, hereinafter referred to as the Free Layer 18 (which has a switchable magnetic orientation along the first direction and a second direction opposite the first direction). When the magnetic polarity of the Free Layer 18 is along the first magnetic direction (i.e., the magnetic direction of the Fixed Layer 16), the optical stack is in a parallel configuration. In the parallel configuration, the optical stack presents an electrical impedance to current flow below an impedance threshold (R). However, when the magnetic polarity of the Free Layer 18 is opposite the first direction (i.e., the magnetic direction of the Fixed Layer 16), the optical stack 10 is in an anti-parallel configuration. In the anti-parallel configuration, the optical stack presents an electrical impedance to current flow higher than the impedance threshold (R).

The arrangement shown in FIG. 1a represents an ultra-thin volume with reduced interaction energy such that small changes (about 0.01 C) in temperature can completely flip the magnetization. These layers function in the so-called "super-paramagnetic regime". Incident radiation (about 1 to 1000 photons) is absorbed on the metal causing a hot-spot i.e. local increase in temperature. This causes a magnetization flip described as a tunneling event between two degenerate magnetic states with equal energy.

The optical stack 10 further includes an electrode layer 22 vertically disposed adjacent the Free Layer 18. The electrode layer 22 is simultaneously configured to receive incident light (i.e., photons) 26 and thus cause heating of the electrode layer 22. Optionally, the optical stack 10 further includes a light absorbing layer 24 to further enhance the sensitivity of the optical stack 10 to incident light 26. In embodiments where the light absorbing layer 24 is provided, the electrode layer 22 is both absorbing as well as transmitting such that light is both absorbed by the electrode layer 22 and allowed to pass through on to the light absorbing layer 24. The heating of the electrode layer 22 with or without the light absorbing layer 24 causes flipping of the Free Layer 18 from one magnetic direction to the opposite magnetic direction as discussed further below. Not shown in FIG. 1a is another electrode layer vertically disposed adjacent the Fixed Layer 16 in order to provide connectivity to downstream circuits (see FIG. 1e for a perspective view of an embodiment of the optical stack 100 according to the present disclosure).

Exemplary materials of the Free Layer 18 and the Fixed Layer 16 include CoFeB, GdFeCo, TbFeCo, CoFe, Co, Pt, Pd, and a combinations thereof. Exemplary material of the barrier layer 20 include magnesium oxide. Exemplary materials for the electrode layer 22 include gold, silver, aluminum, copper, nickel, chromium, indium doped cadmium oxide, and alloys thereof. Exemplary materials for the light absorbing layer 24 is TiN, WSi, NbN and Au.

Referring to FIG. 1b, a precharge sense amplifier with the optical stack 100 is shown. The sense amplifier portion is provided to generate a comparison to a reference resistor $R_{ref}$. In this exemplary embodiment, if current through the reference resistor $R_{ref}$ (i.e., $I_{ref}$) is greater than the current through the optical stack 10 (i.e., $I_{OS}$) then the output of the precharge sense amplifier is 1. If, however, $I_{ref}$ is less than $I_{OS}$, the output of the precharge sense amplifier is 0. It should be noted that $I_{ref}$ is the current based on $R_{ref}$ which is chosen based on the threshold impedance R of the optical stack 10. Thus, in one case when the impedance of the optical stack is higher than R (i.e., the anti-parallel situation), $I_{OS}$ is less than $I_{ref}$ and thus the output of the precharge sense amplifier is 1. In the other case, when the impedance of the optical stack is less than R (i.e., the parallel situation), $I_{OS}$ is greater than $I_{ref}$ and thus the output of the precharge sense amplifier is 0. The precharge sense amplifier is also triggered by a clock signal, in order to maintain synchronicity with the clock signal. When the clock is high, the sense amplifier establishes $I_{ref}$ current, thereby generating a voltage drop across $R_{ref}$. The voltage drop across $R_{ref}$ as well as the voltage drop across the optical stack 100 are fed to the current mirror which generates a digital signal representing status of impedance of the optical stack 100.

Figure 5A:
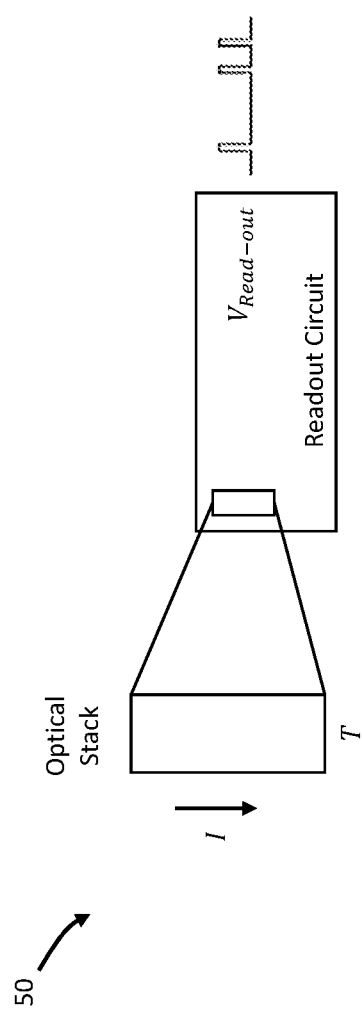
FIG. 5a is a schematic of an optical stack with the associated readout circuit.
Figure 5B:
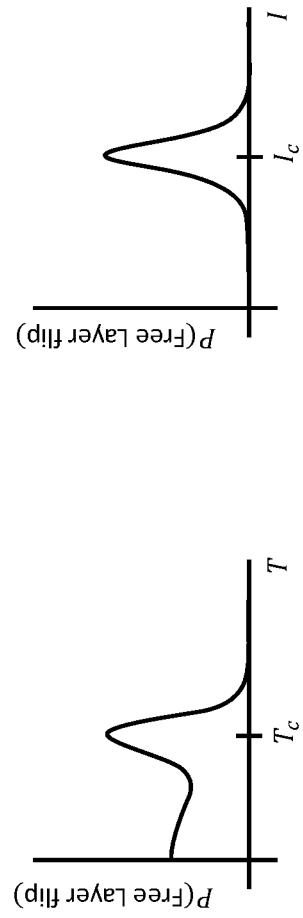
FIG. 5b provides two graphs of probability of switching around critical temperature and current (i.e., read temperature and current).

The read-out of optical stack 10 works on the basis of an energy barrier. Referring to FIG. 1c, a diagram is shown depicting the energy barrier concept. As incident light 26 heats up the electrode layer 22, the Free Layer 18 begins to rise on the energy curve, until it reaches the center peak. Thereafter, the Free Layer 18 flips from one state to the next. As discussed above, if in this new state, the Free Layer 18 is magnetically aligned with the magnetic direction of the Fixed Layer 16, the optical stack 10 is considered to be in the parallel configuration; or if the Free Layer 18 is magnetically opposite with the magnetic direction of the Fixed Layer 16, the optical stack 10 is considered to be in the anti-parallel configuration. Once the Free Layer 18 flips, it slides down the energy curve, thereby the center peak behaves as a barrier to return to the old state, when the incident light is removed. If the incident light is reapplied, the same process occurs again, causing the flipping of the Free Layer 18. If light is allowed to continually shine on the free layer 18 above a predetermined photonic energy threshold, the device switches between parallel and anti-parallel. The number of such switching events can be counted leading to photon counts as the digital output of the device. For pulsed light input below a predetermined photonic energy threshold, a single photon counting event occurs. Referring to FIG. 5a, an optical stack is shown in relationship to a readout circuitry with current I and operational temperature T resulting in a digital output VRead-out. Referring to FIG. 5b, the probability of switching for each nano-pixel due to incident radiation above a predetermined photonic energy threshold is controlled by the critical current (i.e., read current) and critical temperature of between 70° K and 400° K of the bolometric imaging system.

Figure 1D:
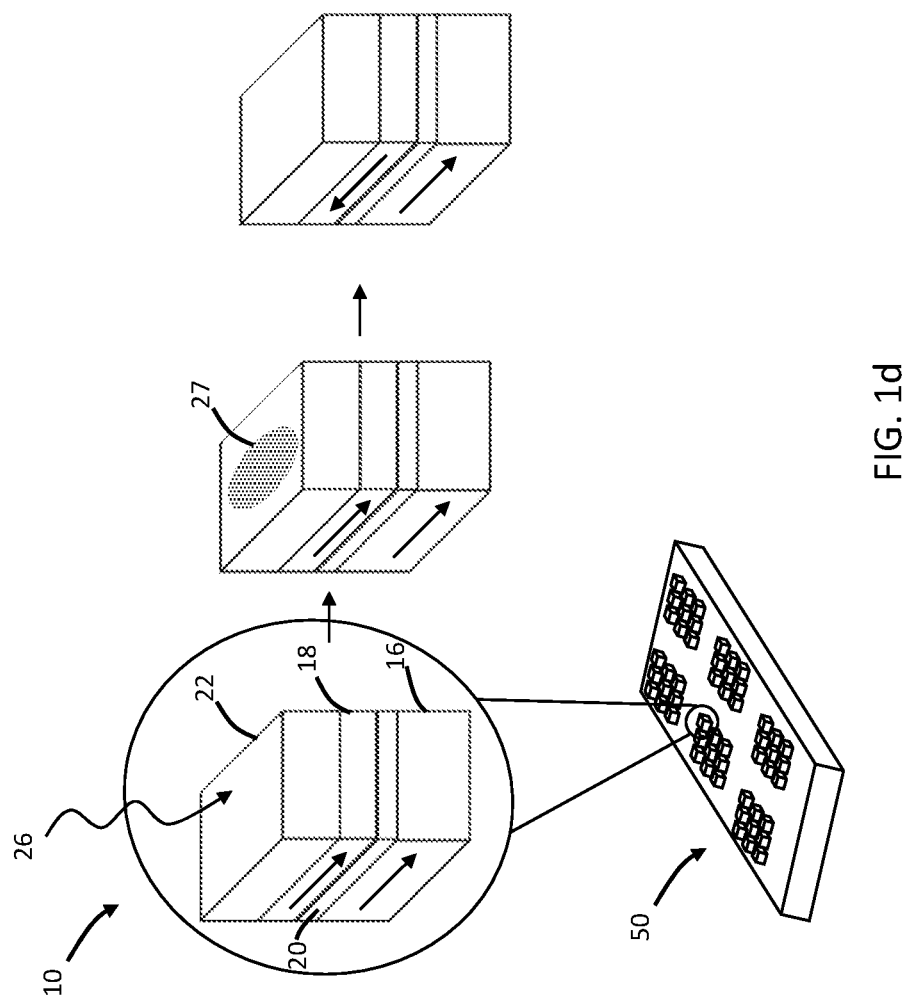
FIG. 1d is a schematic representation of the flipping of an optical stack provided in an array of nano-pixels according to the present disclosure.

Referring to FIG. 1d, a schematic representation of the flipping of an optical stack 10 is shown in an array 50 of nano-pixels. When incident light 26 strikes the electrode layer 22, local heating (optical hot-spot 27) occurs which causes the Free Layer 18 to flip from a parallel orientation to an anti-parallel orientation. The optical hot-spot 27 is formed on the electrode layer 22, which leads to tunneling between two magnetization directions in the Free Layer 18 due to suppression of the energy barrier (see FIG. 1c). The tunable size of the Free Layer 18 controls the magnetic energy interaction. As the Curie temperature and magnetic energy interaction according to the present disclosure can cause the flipping of the Free Layer 18 at room temperature or higher, the present approach offers a distinct new degree of freedom for controlling the sensitivity and operating temperature of this novel nano-bolometer as compared to existing low-temperature superconducting approaches.

When incident light is shone on the optical stack 10, the optical stack 10 begins to heat up. For example, in one embodiment where the optical stack has a 50 nm diameter, longwave infrared (LWIR) photon absorption in the 50 nm diameter optical stack is highly probability of switching (>80%) due to metallic components. Subsequently, nanoscale heat transport occurs across the layers in sub-ns time scales to cause a spin-flip in the Free Layer 18. This mechanism is engineered through optimizing magnetic material properties of GdFeCo/CoFeB and their layer thickness as discussed above to control the "magnetic-phase-transition-like" behavior.

In order to induce magnetization switching of the Free Layer 18 in a desired direction, incident light 26 is converted into heat. If the Free Layer 18 is treated as a single magnetic domain, the spin dynamics can be characterized with a time-varying unit magnetization vector given as $\vec{M}(t)=[M_x(t), M_y(t), M_z(t)]$. When a switching current density (J) is applied to the MTJ, the spin-polarized current exerts spin torque to flip $\vec{M}(t)$ against $\vec{H}_{Keff}$. Here, the spin direction of polarized current depends on the magnetization of the pinned layer $\vec{M}_p(t)$. When the switching current exceeds the critical value, the dynamic precession motion overcomes $\vec{H}_{Keff}$ and flips the magnetization to the opposite stable state. Magnetization switching using the incident light 26 causes the magnetization vector to deviate from the easy axis by an angle $\theta_{ini}$ determined by the temperature of the optical stack 10. The physical behaviors of the optical stack 10 can be captured using four dedicated SPICE sub-circuits: namely, anisotropy, STT, TMR, and temperature sub-circuits. The anisotropy circuit generates the effective anisotropy field ($\vec{H}_{Keff}$) for a given optical stack dimensions and material parameters. Numerically, the Landau-Lifshitz-Gilbert (LLG) equation is a differential equation containing cross products of three dimensional vectors (i.e. $\vec{M}$ and $\vec{H}_{Keff}$). In terms of circuit implementation, the differential behavior of M can be captured using a capacitor with voltage dependent current sources connected in parallel, which emulates an incremental charge build-up over time in the capacitor: I=CdV/dt. Three current sources in FIG. 1f (which is a schematic of an optical stack model based on the LLG equation also shown in FIG. 1f) represent the precession, damping, and spin torque terms in the LLG equation, and their vector cross product can be converted into linear forms in the SPICE model definition.

One challenge with the present approach is dark count. Extraneous sources can cause dark counts in the nano-pixel because of (i) temperature fluctuations (thermal noise) (ii) read-out current fluctuations (iii) stray magnetic fields fluctuations (iv) targeted absorption and highly efficient hot-spot creation (v) targeted heat transport to the free layer (vi) reduction of parasitic heat transport to side-walls. However, according to one embodiment, cooling the device below room temperature can reduce dark counts. The thermal stability factor is given by $\Delta=E_b/k_BT$, where $E_b$ is the barrier height, $k_B$ is Boltzmann's constant, and T is the temperature.

$$F = 1 - \exp\left[-\exp\left(-\Delta + \Delta \frac{I_R}{I_{CO}}\right)\right]$$

describes the rate at which a thermal event triggers a domain flip for a continuous read operation where $I_{CO}$ is the threshold switching current and $I_R$ is the read current. By reducing the device temperature, lower rates of domain flips (or dark counts) due to thermal noise will occur, improving the sensitivity. Therefore, according to one embodiment a cooling stage is also included for thermal stabilization, to set the device below a critical temperature and for control over dark counts. Sensor cooling will be accomplished using a cold finger cryocooler, which is a known method of temperature regulation in IR detectors. Specifically, a RICOR K508N which is a cryocooler with a temperature controller is one option for cooling. When the cooler is at room temperature, it has about 1 W of cooling power for cooling to 110 K. This device can be set from 65-110 K with stability of 0.5 K. The cold finger device is coupled to a heat spreader/heat sink, which is in turn coupled to the nano-pixel array. The cooling stage and nano-pixel array sit in a custom DEWAR chamber held at vacuum with output ports for each of the channels of the nano-pixel array, which go out for processing by an FPGA or an ASIC. According to an alternative embodiment, the DEWAR chamber is filled with liquid coolant to provide extra cooling capacity and to help avoid noise from large thermal transients. In yet according to another alternative, thermoelectric cooling and temperature stabilization can be used as is known to a person having ordinary skill in the art. Thermoelectric cooling via a Peltier device provides an attractive alternative cooling method for higher temperature ranges. Thermoelectric coolers have many advantages to cryocoolers. They have a larger cooling power (60-100 W), better temperature stability (0.005 C), and can be set over a wider range of temperatures (220-300 K).

Additionally, current noise can cause dark counts and place other constraints on the system readout. During readout the device is biased below a critical current. To avoid current noise, biasing, discussed below, is performed through an RF bias-T using a low-noise current source. RF bias-Ts have three paths DC, RF, and RF/DC. The idea behind an RF bias-T is to separate the DC and RF signals using an inductor for the DC-coupled path and a capacitor for the RF-coupled path. The detector is placed on the RF/DC path such that it can be biased with current while reducing the noise from the current source. Signals produced by the detector exit through the RF path. Low noise current sources can be built by combining op-amps, matched resistors and feedback.

Following a magnetization flip, a read-out for the bolometric imaging system exploits tunnel magneto-resistance effect, known to a person having ordinary skill in the art, e.g., using tunnel magneto-resistance effect employed in commercial MRAM technology.

As discussed, the Fixed Layer 16 is separated by the barrier layer 20 (i.e., a tunneling barrier) from the Free Layer 18. Also as discussed, the tunneling resistance of the entire optical stack 10 is high or low based on whether the magnetizations are anti-parallel or parallel. Thus, important figures of merit that capture the performance of the bolometer of the present disclosure are (i) hot-spot formation efficiency of the contact (ii) magnetization energy of the Free Layer 18 and (ii) tunneling magneto-resistance (TMR) for read-out. Together (i) and (ii) capture transduction efficiency and (iii) governs read-out efficiency of the nano-pixel.

One important aspect of the optical stack 10 of the present disclosure is that differing spectral resolution and sensitivity is achieved through differing sizes and materials of the optical stack 10 within a sub-wavelength volume. This selective approach to spectral resolution and sensitivity is not possible with any existing approach of the prior. Thus, in an array of nano-pixels (discussed with respect to FIG. 2a), providing different sizes and material selection of optical stacks 10 can lead to different spectral sensitivity for use in hyper-spectral imaging.

An advantageous feature of the nano pixel of the present disclosure is that no reset is needed. Existing ultra-low noise single photon detector technologies require active reset causing pixel cross-talk, after-pulsing and latency issues. However, the nano-pixel of the present disclosure operates on the basis of the tunnel magneto-resistance (TMR) which represents a paradigm shift in read-out circuitry since both tunneling events: high-resistance to low-resistance state or vice-versa lead to detector counts. This implies both the 0 to 1 and 1 to 0 transitions represent detector clicks unlike existing architectures which require resetting of the pixels. This advantageous feature improves response time of the nano-pixel. The output voltage pulse (few nanoseconds wide) shown in FIG. 1b as OUT, occurs due to the change in magneto-resistance following the spin-flip. After this spin-flip, no active reset is necessary as the subsequent spin-flip can also be read-out through a magneto-resistance decrease (as opposed to increase). Since no reset is needed, the optical stack 10 represents a major benefit as compared to existing technologies where an active reset of the pixel is needed.

Figure 1E:
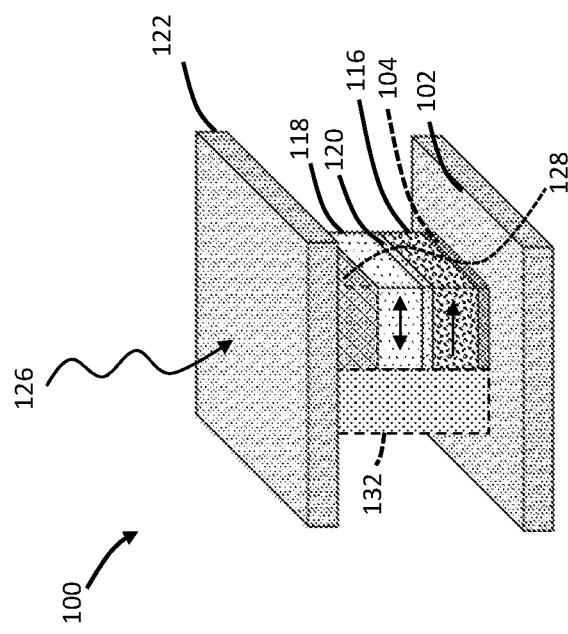
FIG. 1e is a perspective view of an embodiment of the optical stack according to the present disclosure.
Figure 1F:
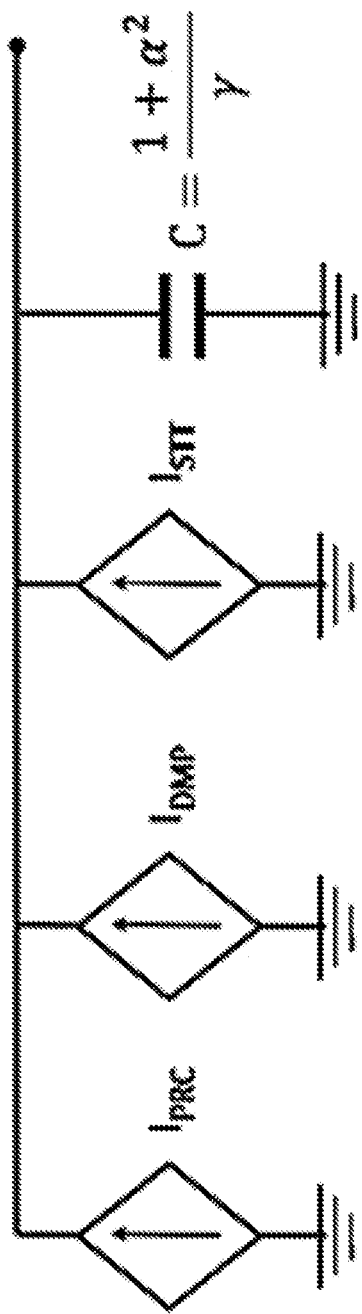
FIG. 1f is a schematic of an optical stack model based on the LLG equation which is also shown in the figure.

Referring to FIG. 1e, a perspective view of an embodiment of an optical stack 100 is shown. The optical stack 100 includes a first electrode 102 coupled to a Fixed Layer 116 which is vertically disposed adjacent a barrier layer 120 which is in turn vertically disposed adjacent a Free Layer 118. Optionally, a reflective layer 104 is placed vertically disposed adjacent the first electrode 102. As before (i.e., with reference to FIG. 1a), the magnetic polarity of the Fixed Layer 116 is fixed, while the magnetic directions of the Free Layer 118 is switchable to be either aligned with the magnetic polarity of the Fixed Layer 116 (i.e., generating a parallel configuration) or opposite (i.e., generating an anti-parallel configuration) with the associated electrical resistances to current flow. The optical stack 100 optionally includes a light absorption layer 128 atop the Free Layer 118. A second electrode 122 is further vertically disposed in the optical stack 100 which is configured to receive incident light 126. Optionally, the optical stack 100 includes a thermally insulating layer 132 horizontally disposed from the other layers in the stack. Optionally, the outwardly disposed electrode 102 is also coated in an antireflection coating.

Figure 2B:
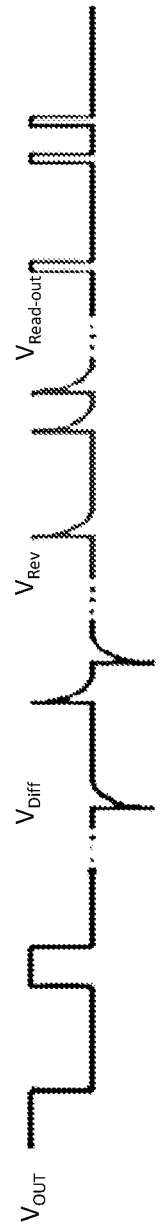

Referring to FIG. 2a, a schematic of a nano-pixel 200 is shown. The nano-pixel 200 includes a precharge sense amplifier with an optical stack as discussed in relationship to FIGS. 1a and 1b. The nano-pixel also includes additional stages including a passive differentiator, a diode bridge, and comparator. Referring to FIG. 2b, voltages associated with each of these stages is also shown. The output of the precharge sense amplifier ($V_{OUT}$) was discussed in reference to FIG. 1b. That output ($V_{OUT}$) is then differentiated using a simple differentiator which includes a capacitor and a resistor. Exemplary voltage resulting from the differentiator stage is shown in FIG. 2b. Upon each voltage rise and fall, the differentiator provides a corresponding response based on the RC time constant of its circuit. Therefore, when $V_{OUT}$ rises from zero to high, the output of the differentiator rises suddenly and then decays according to the RC time constant. Similarly, when $V_{OUT}$ drops from high to zero, the output of the differentiator drops suddenly to a relative negative value and then rises according to the RC time constant. The output of the diode bridge is also shown. This output is similar to the differentiator output except the polarity of all negative values are reversed. Finally, the read-out voltage ($V_{Read-out}$) from the comparator represents a high when the output of the diode bridge stage is above the $V_{ref}$.

Figure 3:
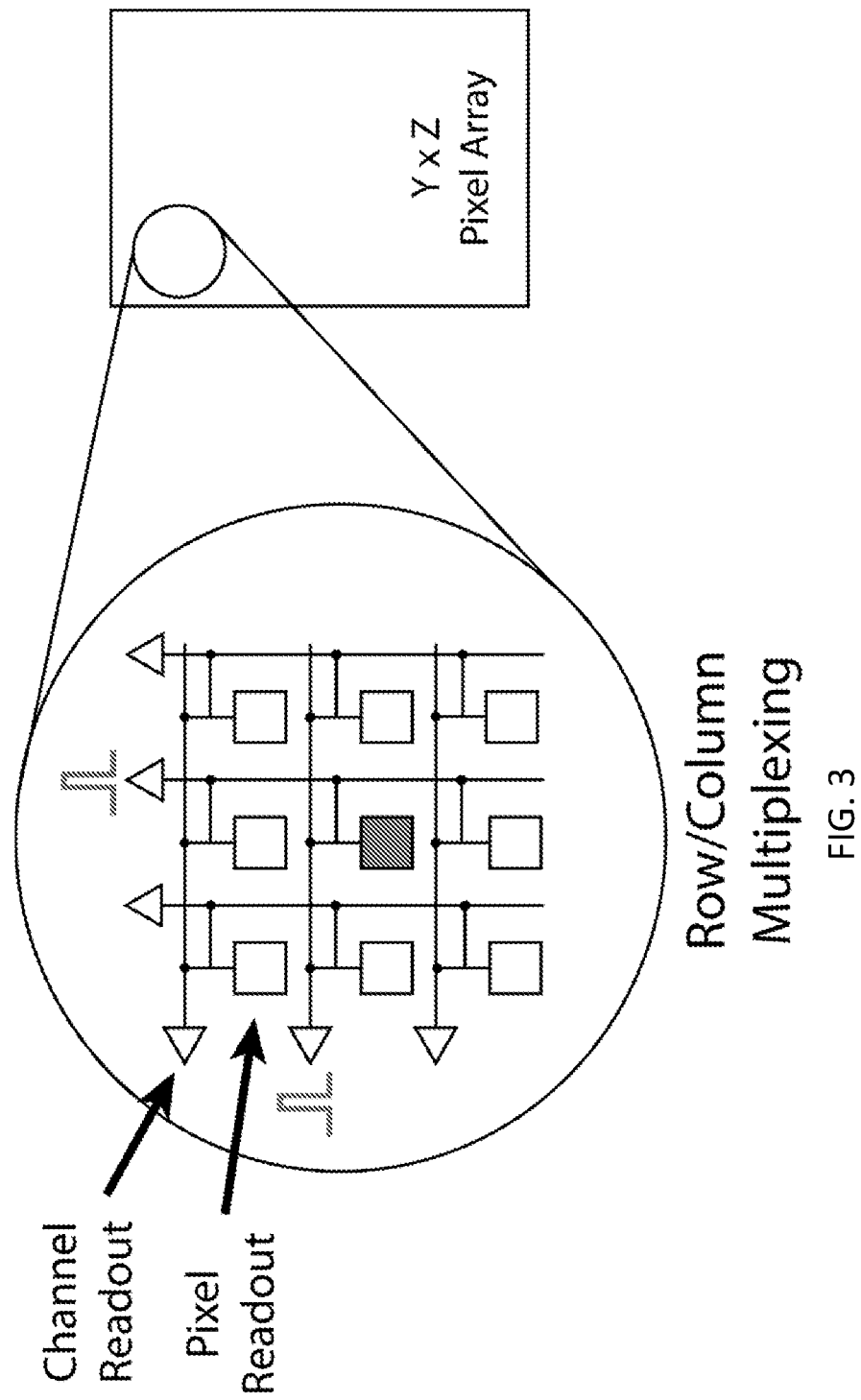
FIG. 3 is a schematic of a megapixel array through the use of time-correlated readout of row/column multiplexed signals according to the present disclosure.

As discussed above, incident light on an optical stack triggers a spin flip in the Free Layer which is accompanied by a change in the impedance of the optical stack. This can be read out as a voltage change with the precharge sense amplifier circuit (PCSA) as shown in FIG. 1b. In the PCSA circuit the state of the optical stack is read out on rising edges of a clock signal. If a light detection event has occurred, the PCSA's output voltage changes state. To simplify triggering, additional circuitry is used to convert the signal into a pulse as provided in FIG. 2a. Voltage transitions are converted into pulses using a differentiator and diode bridge, which are then digitized with a comparator. The use of a comparator has the added benefit of rejecting crosstalk and AC noise. For larger arrays of pixels, the transition conversion circuitry is used on a row/column basis. The optical stack and the nano-pixel shown in FIGS. 1a, 1b, and 2a are utilized in a megapixel array through the use of time-correlated readout of row/column multiplexed signals as shown in FIG. 3. Time correlations between the rows and columns are used to determine which nano-pixel the signals came from. An N×N array is read out with 2×N channels. Timing detection can be implemented using calibrated, high-precision, high-channel time-to-digital converters (TDC) on field programmable gate array (FPGA) hardware. High-channel TDCs have been implemented on FPGAs in the past, but hardware resource limitations prevented channel counts above 256. However, modern FPGA include sufficient hardware resources and more than 2000 general purpose input/output (GPIO) channels, allowing a 1 Mpixel (1000×1000) image to be time-tagged. In place of an FPGA, an application specific integrated circuit (ASIC) can also be used providing even faster clock speeds.

Referring to FIG. 3, a schematic of an array configuration of nano-pixels is shown. The array includes a Y rows by Z columns. A multiplexer, not shown, can be used to selectively receive output of a nano-pixel of interest.

Figure 4:
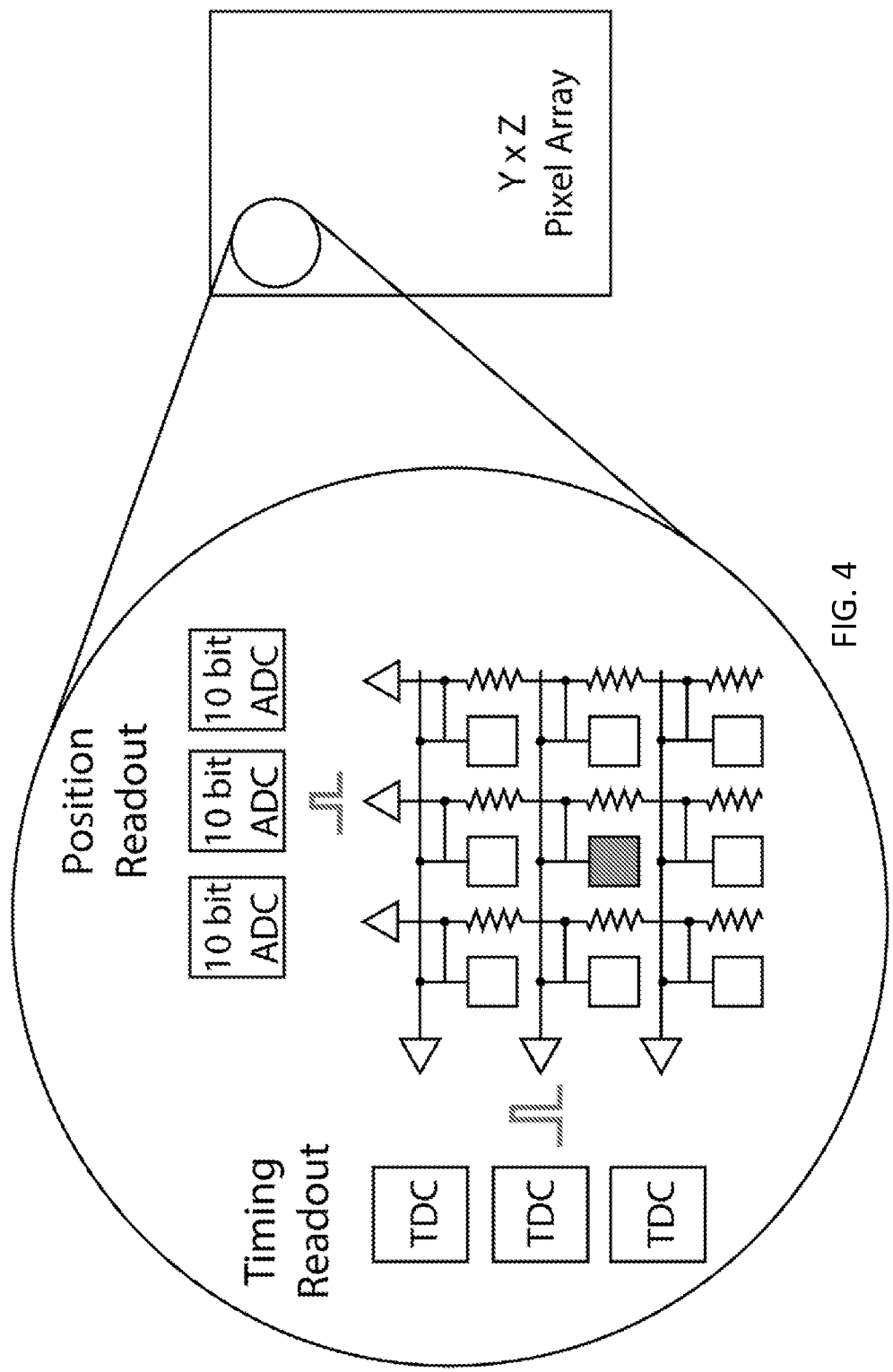
FIG. 4 is a schematic of a multiplexing scheme according to the present disclosure.

With reference to FIG. 4, which is a schematic in which a novel multiplexing scheme is disclosed which is ultrafast, scalable, and simplifies demultiplexing of timing and positioning information of asynchronous events from an array of pixels. In this scheme, amplitude division multiplexing implemented along the columns allows for full position readout of asynchronous events. Amplitude encoding of the row position is implemented either through resistors or amplifiers placed between pixels on the columns. Amplitude signals can be filtered into easily readable signals using a simple peak-detector circuit. Analog to digital converters (ADC) connected to the output of each of the columns are used to convert the amplitude signal from an event on the column into the row position. This allows for position readout of events of an N×N array with N channels. For asynchronous event timing readout, pixels are connected to channels along the rows. Time to digital converters (TDC) connected to the output of these channels allows for timing readout of an N×N array with an additional N channels. By synchronizing the clock used for the TDC and ADC, full event timing and positioning information can be demultiplexed and acquired simultaneously. This method scales to larger arrays with higher ADC bit depth, and faster speeds with higher synchronization clock rates.

As discussed above, the size and material selection of each nano-pixel in the array can be used to generate selective spectral sensitivity and resolution. This selectivity can be advantageously used to pattern nano-pixels in the array of FIG. 1d. Towards this end, nano-pixels sensitive to infrared (IR), red, green, and blue light can be patterned into the array. Accordingly, in one embodiment, in each column and in each row, alternatively nano-pixels are inter-disposed based on IR-Red-Green-Blue-IR-Red- . . . sensitivities. Accordingly, by accessing a first pattern of nano-pixels, an IR image can be reconstructed. Alternatively, by accessing a second pattern of nano-pixels, an image based on incidence of red light can be generated, and so on. This multi-spectral simultaneous, high-speed imaging is highly advantageous for modern cameras.

Those having ordinary skill in the art will recognize that numerous modifications can be made to the specific implementations described above. The implementations should not be limited to the particular limitations described. Other implementations may be possible.

The invention claimed is:

1. A bolometric imaging system, comprising:
   an array of nano-pixels, each nano-pixel comprising:
      an optical stack, comprising:
         an electromagnetic absorptive layer where incident radiation is converted to heat which simultaneously acts as a second electrode layer vertically disposed atop a selective magnetic polarity layer (Free Layer),
         a fixed magnetic polarity layer (Fixed Layer) having a first magnetic polarity direction,
         a barrier layer vertically disposed atop the Fixed Layer,
         the Free Layer vertically disposed atop the barrier layer, wherein when the magnetic polarity of the Free Layer is along the first magnetic polarity direction, the optical stack is in a parallel (P) configuration whereby the optical stack presents an electrical impedance to current flow below an impedance threshold, and when the magnetic polarity of the Free Layer is opposite the first magnetic polarity direction, the optical stack is in an anti-parallel (AP) configuration whereby the optical stack presents an electrical impedance to current flow higher than the impedance threshold;
      a first electrode layer vertically disposed below the Fixed Layer,
      whereby photons absorbed by the optical stack are converted into heat to thereby switch the magnetic polarity of the Free Layer, wherein the switch in magnetic polarity does not require the optical stack to be reset to a neutral state prior to such switching; and
      a readout circuit coupled to each nano-pixel configured to monitor voltage drop across the optical stack and provide a corresponding signal when the impedance across the optical stack changes.

2. The bolometric imaging system of claim 1, wherein the material of the magnetic Fixed Layer and the Free Layer is selected from the group consisting of CoFeB, GdFeCo, TbFeCo, CoFe, Co, Pt, Pd, and a combinations thereof.

3. The bolometric imaging system of claim 1, wherein the electromagnetic absorptive layer is configured to receive and convert excitation by photons above a selected photonic energy threshold into heat.

4. The bolometric imaging system of claim 3, wherein the selected photonic energy threshold is selected based on ratio of area of a nano-pixel in the array of nano-pixels to distance between two adjacent nano-pixels in the array.

5. The bolometric imaging system of claim 1, wherein the barrier layer includes MgO.

6. The bolometric imaging system of claim 1, wherein the readout circuit generates a digital output corresponding to the change in electrical impedance of the optical stack.

7. The bolometric imaging system of claim 1, wherein the readout circuit signal is multiplexed through electrical channels provided on rows and columns of the array of nano-pixels.

8. The bolometric imaging system of claim 1, wherein each nano-pixel is sized between about 10 nm and about 1 μm.

9. The bolometric imaging system of claim 8, wherein spectral sensitivity to wavelength of incident photons is based on the electromagnetic absorption of the layers in the optical stack.

10. The bolometric imaging system of claim 1, wherein the optical stack further comprises an anti-reflection coating outwardly disposed on the first electrode layer.

11. The bolometric imaging system of claim 10, wherein the nano-pixel is sensitive to infrared light when the nano-pixel is between about 20 nm and about 200 nm.

12. The bolometric imaging system of claim 1, wherein optical polarization sensitivity is based on a patterning direction of the optical stack.

13. The bolometric imaging system of claim 1, wherein the optical stack further comprises a light absorption layer disposed between the Free Layer and the second electrode layer.

14. The bolometric imaging system of claim 1, wherein the electromagnetic absorptive layer includes TIN, WSi, NbN, Au.

15. The bolometric imaging system of claim 1, wherein the optical stack further comprises a light reflective layer vertically disposed above the first electrode layer and below the Fixed Layer.

16. The bolometric imaging system of claim 1, wherein the nano-pixel further comprises a heat insulating layer disposed horizontally next to the optical stack.

17. The bolometric imaging system of claim 1, wherein the readout circuit signal is multiplexed through a multiplexing system comprising:
- a plurality of electrical channels along a first direction wherein each of the plurality of the electrical channel comprises:
    - an electrical impedance placed between the nano-pixels to thereby encode the nano-pixel position in the signal amplitude; and
- a series of electrical channels along a second direction.

* * * * *